Patented June 4, 1929.

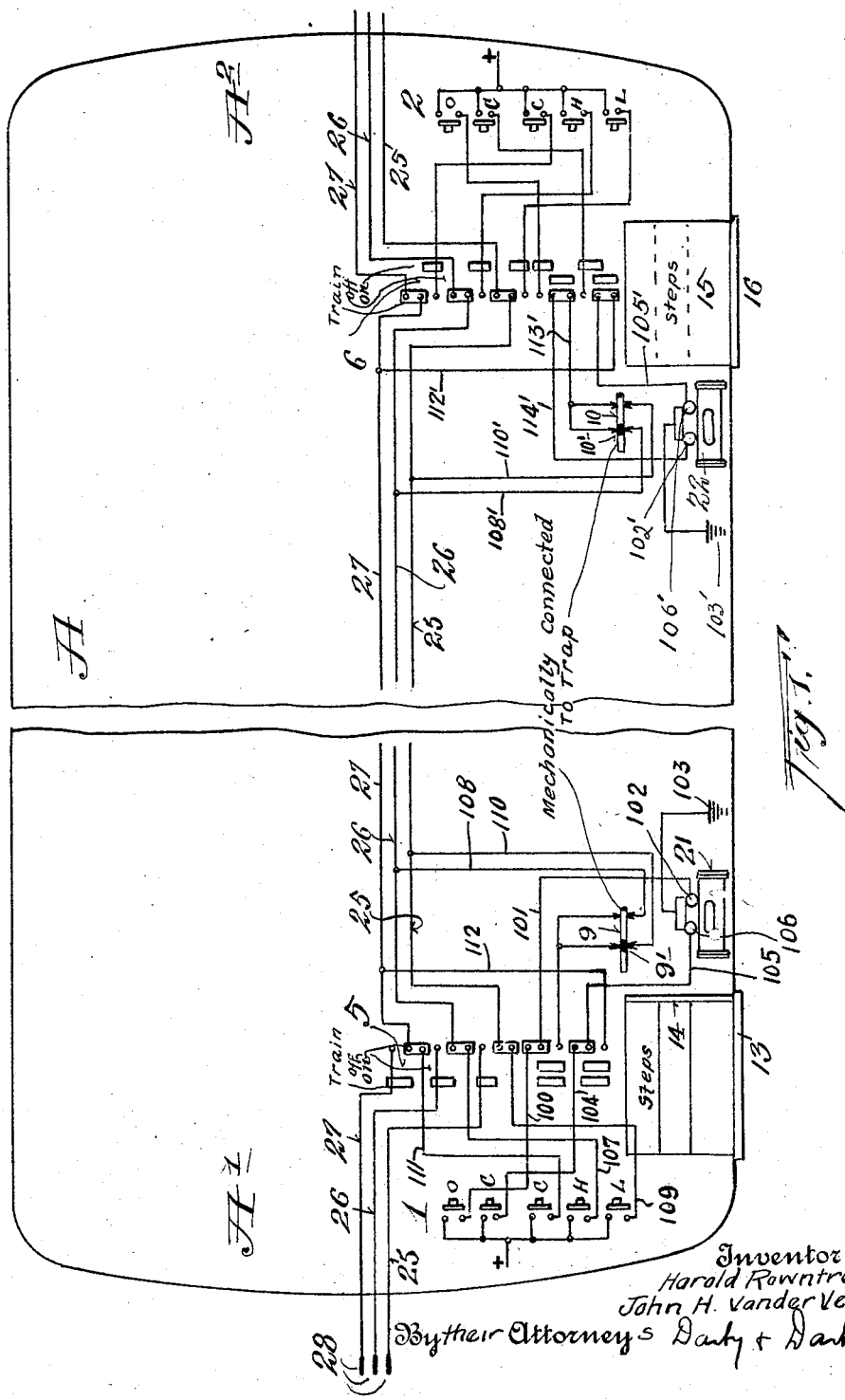

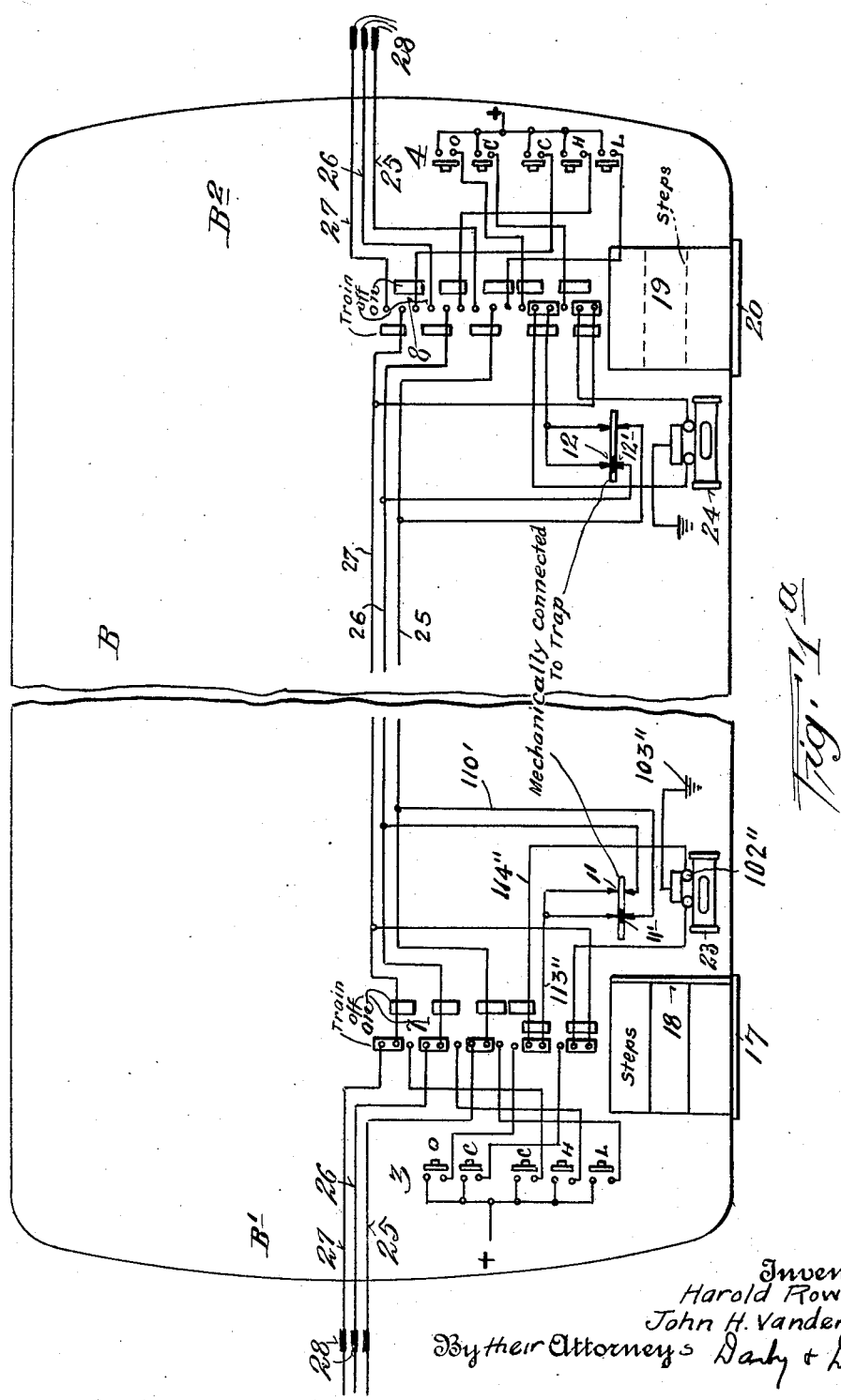

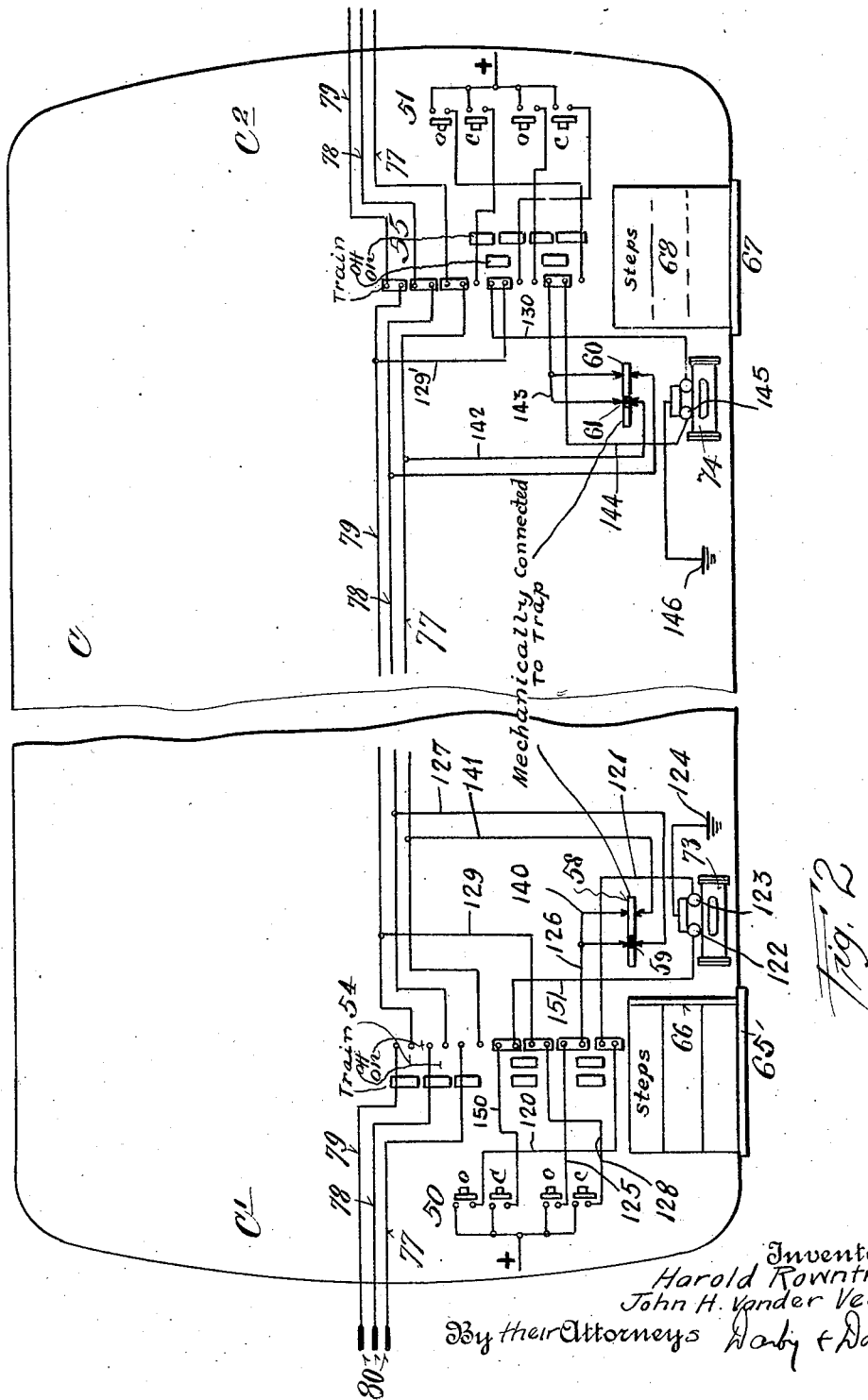

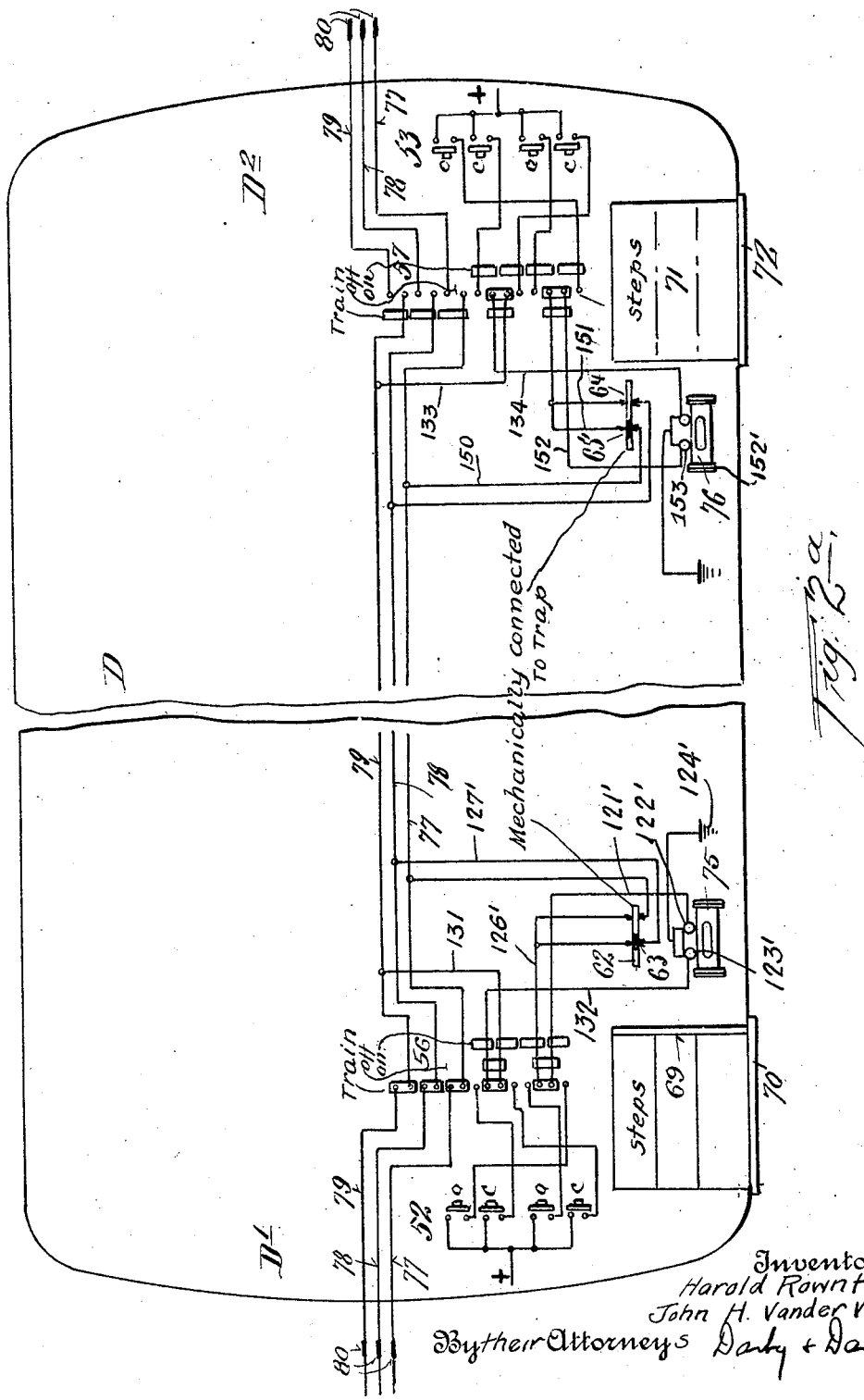

1,715,515

UNITED STATES PATENT OFFICE.

HAROLD ROWNTREE, OF SCARSDALE, NEW YORK, AND JOHN H. VANDER VEER, OF WESTFIELD, NEW JERSEY, ASSIGNORS TO NATIONAL PNEUMATIC COMPANY, OF NEW YORK, N. Y., A CORPORATION OF WEST VIRGINIA.

MULTIPLE-UNIT CONTROL FOR VEHICLE DOORS.

Application filed March 1, 1926. Serial No. 91,309.

This invention relates broadly to electrical means for controlling the operation of doors on vehicles.

One of the objects of this invention is the provision of a new and novel system of control whereby the doors of vehicles may be adapted for operation in connection with either high or low level platforms.

Another object of this invention is the use of a system employing either a five push button control box or a four push button control box. Another object of this invention is the provision of a system of door control for a train comprising a plurality of cars whereby by means of drum switches located at each end of each car, the train may be broken up into any desired number of units comprising any desired number of cars.

A still further object of this invention is the provision of a door control system whereby the doors on the cars comprising each group may be controlled by a single operator.

Another object of the invention comprises the production of a multiple unit door control system whereby the operator may only control the distant doors in the other cars under his management, which have their traps in the same position as the trap of the door adjacent the control point.

A still further object of the invention is the production of a control system whereby the operator may control the doors for either high or low level platforms regardless of the position of the trap on the door at the point of control.

These and many other features which will appear as our invention is described constitute the objects of this invention.

Another object of our invention is the provision of a door control system of the above type, by means of which it is possible to close all the doors that are open regardless of how or under what conditions they were opened.

Our invention resides substantially in the combination, construction, arrangement and relative location of parts in a circuital system, as will be more fully pointed out in the specification in connection with the drawings.

Referring to the drawings in which the same reference numerals will be used throughout the several views, to indicate the same, or all the similar parts, Figures 1 and 1ª taken together are a diagrammatic plan view of two adjacent cars employing our novel door control system.

Figs. 2 and 2ª represent a diagrammatic plan view of two adjacent cars employing a modified arrangement for controlling the doors on the cars.

In the operation of many transportation systems, the trains are often run into stations employing high level platforms and on the same line are also run into stations employing low level platforms.

By high level platforms, we mean platforms of such height relative to the height of the car, that it is only necessary to merely open the doors of the cars leaving the traps down, so that the passengers may walk off on to the platform which is in the same plane with the traps of the cars when they are down.

By low level platforms are meant those platforms which are of such height with respect to the car, that it is necessary to open both the traps and the doors, in order that the passenger may descend the steps of the car and alight on the platform.

By the use of the circuit illustrated in Figs. 1 and 1ª, the operator may control the doors of the cars in the unit under his management, for use at either low or high level platforms regardless of whether the trap at the point of control is up or down. In the construction illustrated in Figs. 2 and 2ª, however, it is only possible to control the distant doors of the cars in the unit under his management, which have their traps in the same position as the trap of the door at the point of control. In other words, the position of the trap of the door at the point of control determines which of the remote doors may be opened by the conductor.

In both of these systems all the doors remote from the door at the control point that are opened at any time may be closed by means of a single control button.

For the purpose of description, we have shown a unit comprising two cars. All the doors of this unit will be under the control of a single operator, who would be stationed at the point A¹ of the car A. The circuits for one side of the cars only have been shown, for the sake of simplicity, since the circuits for the doors on the other side of the cars will be exactly the same as those disclosed in the drawings. At the control point A¹ is a five button control box having a button marked o which button is intended to open the door adjacent the point of control, regardless of the position of the trap. The button directly below it marked C is intended for the purpose of closing this door. The next button marked c is for the purpose of closing all the doors that are open with the exception of the door at the control point. The button indicated by the letter H is intended to open all the doors to be used at a high level platform, and the button L is to be used to open all doors adapted for entrance and exit at low level platforms. At the end A² of the car A is a similar five button control box 2; at the end B¹ of the car B is another five button control box 3, and at the end B² of the car B is another five button control box 4. Located at each end of each car and adjacent the control boxes are the three position drum switches 5, 6, 7 and 8.

The contacts on these drum switches which are all alike are arranged in three rows and marked "Train", "Off" and "On". When the contact fingers are on the row of contacts marked "Train" the circuits of that car are continued on to the next car and also on to the point of control. When the contact fingers are on the contacts marked "Off", the train circuits are broken at that point and when they are on the contacts marked "On" the control box adjacent that drum switch is placed in control of the train lines. Thus by means of these drum switches, the train may be broken up into as many units as desired, comprising any number of cars.

Mounted adjacent the traps of each of the doors is a pole switch, comprising a spindle 9, and having mounted on it a metallic ferrule 9'. The pole switch is so associated with its trap that it places the ferrule in contact with either of the two sets of contact fingers, depending upon the position of the trap which operates it. Referring to one side of the cars only, there are shown the doors 13 and 16 on the car A and the doors 17 and 20 on the car B. Associated respectively with these doors are traps 14 and 15 on car A and the traps 18 and 19 on car B. Operated respectively by these traps are the pole switches 9 and 10 on car A and 11 and 12 on car B. The pole switches 10, 11 and 12 have mounted on them the contacting ferrules 10', 11' and 12', respectively.

Adjacent each door and operatively connected with them are the pneumatic door opening engines 21, 22, 23 and 24, respectively, with their electric control valves.

Each car has extending throughout its length and passing through the drum switches, the car lines 25, 26, and 27, on the ends of which are the connectors 28 for associating the circuits of the adjacent cars with each other. These train lines are sectionalized by means of the drum switches.

The operation of this particular system is as follows:—

For purposes of description, we will assume that a particular unit under the control of the operator comprises merely the two cars A and B. The circuits are so arranged that the operator must stand at the control point A¹. When the train pulls into a station, the operator pushes the button o of the control box 1 causing the door engine 21 to open door 13 regardless of the position of the corresponding trap. Closure of push button o establishes a circuit from the positive side of the current source through push button o, wire 100, drum switch contact to wire 101, opening magnet valve 102 to ground 103. Magnet valve 102 is of the well known type in this art disclosed for instance in the patent to Rowntree, 1,292,077, January 21, 1919 and serves to admit fluid pressure to engine 21 to cause door 13 to open. When button C is pushed, the following circuit is formed: from the positive side of the current source, through push button C, wire 104, the contact on the drum switch, wire 105, magnet valve 106 to ground at 103. This operates the engine 21 to close door 13. The magnet valve 106 is of the same character as magnet valve 102. It is to be noted that the door adjacent the control point is under the control of the operator independently of the position of the trap at the control point. In other words the pole switches and circuits are arranged so that the door adjacent the control point may be operated independently of the trap. The operator by looking out the door may then tell whether the station presents a high or low level platform. If it be a high level platform, none of the traps are disturbed, but the high level button H is depressed causing the current to open all the doors which have their traps down. By closing the push button marked H, the following circuit is established: from the positive side of the current source through push button H, wire 107, the contact on drum switch 5, wire 26, wire 108', ferrule 10', wire 113', contact on drum switch 6, wire 114', opening magnet valve 102' and thence to ground at 103'. This causes engine 22 to open door 16 and there are opened simultaneously all other doors with their traps down so that the corresponding pole switches complete the circuits to the opening magnet valves of the corresponding doors (as for instance door 20). After all the passengers have departed from the train and boarded the train, the operator may then push the lower button marked c, and all doors which are open will close except the door 13. Closure of push button o establishes the following circuit: from the positive side of the current source through push button c, wire 111, the control or drum switch, 5, wire 27, wire 112', the contact on drum switch 6, wire 105', closing magnet 106' and thence to ground at 103'. This causes door 16 to close and similarly all other doors that are open become closed. If the station had been a low level station, the train conductors would then raise all the traps and when the operator pressed the button marked L, all the doors would open, whose traps had been raised. When switch L is closed the following circuit is established: from the positive side of the current source through button L, wire 109, the contact on drum switch 5, wire 25, the contact on drum switch 6, connected to wire 25, wire 25 to the next car, the contact on drum switch 7 connected to wire 25, wire 25 on car B, wire 110'', ferrule 11', wire 113'', the contact on drum switch 7, connected to wire 113'', wire 114'', opening magnet valve 102'' and thence to ground at 103''. This opens door 17 and similarly all other doors having their traps up. It is to be understood that the respective pole switches are properly positioned in accordance with the positions of the corresponding traps. However, if for any reason some particular trap had not been raised that door will not open when the low level button is pushed.

Here again when the lower button marked c is depressed all the doors which are open will close. The button marked C directly above it will close only the door adjacent the point of control. By the foregoing description, it is evident that the operator may control all the doors remote from his station regardless of the position of his trap, but low level doors will not be opened, where the traps are down, nor will high level doors be opened where the traps are up.

Referring to Figs. 2 and 2ª there is disclosed a modification of our invention, characterized by the feature that the circuits are under the control at the trap of the door, at the point of the control. For purposes of description, the unit under control of the operator comprises the two cars, C and D. As previously stated any unit may comprise any desired number of cars. At the control point C¹ is a four button control box 50. A similar control box 51 is at the point C², a similar control box 52 is at the point D¹, and a similar control box 53 is at the point D². Associated with each of these control boxes are three position drum switches as before 54, 55, 56 and 57, respectively. The construction of these drum switches has already been described and as stated they serve the purpose of sectionalizing the train lines. The car C has the door 65 and its trap 66 and the door 67, with its trap 68. The trap 66 operates the pole switch 58 with its contacting ferrule 59 as before. The trap 68 operates its pole switch 60 with its contacting ferrule 61. On the car D is the door 70 and its trap 69 which operates its pole switch 62 having the contacting ferrule 63 and the door 72 and its trap 71 which controls the pole switch 64, with its contacting ferrule 65. The doors 65' 66, 70 and 72 are respectively operated by means of the pneumatic door engines 73, 74, 75 and 76, respectively, with their electrically operated valves. It may be stated that these door engines are of the usual and well known construction and form no part of this invention.

Each of the cars employing this modified circuit has the train lines 77, 78, and 79 which are sectionalized into any desired number of groups comprising any number of car circuits by means of the drum switches as stated before. The ends of the train line are equipped with the connectors 80 for associating the circuits of the adjacent cars. These connectors are of the usual and well known type employed in this art.

When a train employing this circuit arrangement pulls into a station, the operator who is stationed at the point C¹ depresses the push button marked o to open the door 65', adjacent the point of control regardless of the position of the trap. Closure of push button o completes the following circuit: from the positive side of the current source through upper push button o, wire 120, wire 121, magnet valve 122 and thence to ground at 124. As a result, door 65' opens. He then ascertains whether the station is equipped with high or low level platforms. If it is a high level platform, he leaves his trap down and pushes the lower button marked o. The following circuit is formed: from the positive side of the current source through the lower push button marked o, wire 125, wire 126, wire 140, ferrule 59, wire 141, wire 77, wire 142, ferrule 61, which is moved over as the trap is down, wire 143, wire 144, wire 142, ferrule 61, wire 143, wire 144, opening magnet 145 and thence to ground at 146. This opens door 67. The current also travels through wire 77, wire 150, ferrule 65, wire 151, wire 152, opening magnet 153 and thence to ground at 154. This opens door 72. Thus it will be noted that only those doors are opened whose traps are in the same position as the trap at the control point. Similarly to open the door 70 push button o is depressed, the current then flows from the positive side of the current source through the push button o, wire 125, wire 126, ferrule 59, wire 127, wire 78, wire 127', ferrule 63, wire 126', wire 121' through magnet valve 122' to ground at 124'. This causes door 70 to open. This opens all the doors in the unit under his control whose traps are down. By pushing the lower button marked c all the doors which are open with the exception of the one at the point of control will be closed. The current in this case passes from the positive side of the current source through lower push button c, wire 128, wire 129, to wire 79 and thence to wires 129', 131 and 133 and finally to the closing magnet valve on each engine through wires 130, 132 and 134 respectively. This causes all open doors to close except the one at the point of control. If his inspection discloses the train at a station equipped with low level platforms, he raises the trap of the door adjacent the control point which operates the pole switch to the position illustrated in the drawings, where the train has been illustrated as arranged for use at a low level station. The operator then pushes the lower button o which closes the opening circuits to the door engines of all doors whose traps are up; thus only the doors with the traps raised will be opened and those having the traps closed will not be operated. The following circuit is formed: in this case from the positive side of the current source through lower push button o, wire 125, wire 126, ferrule 59, wire 127, wire 78, through drum switch 55, wire 78, wire 127, ferrule 63, wire 126', wire 121', opening magnet valve 122' and similarly thence to ground 124'. Door 70 is opened and all other doors with their traps up. Again by pushing the lower button marked c, all open doors will be closed with the exception of the door at the point of control. The upper button marked c is merely for the purpose of closing the door adjacent the point of control. The door 65 at the control point is closed by means of upper push button c. The following circuit is formed: from the positive side of the current source through the closure of upper push button c, wire 150, wire 151, closing magnet 123 and thence to ground at 124.

The circuits in the two groups of drawings have been shown and arranged for operation at a station having a low level platform. The path of the current in each instance has been specifically indicated. With the aid of the foregoing description, it is believed that one skilled in the art may readily follow out the path of the current in the circuits for each of the operations indicated.

We have now described our invention embodying the fundamental principles as indicated which may be employed in circuits of many modifications and arrangements which will suggest themselves to one skilled in the art without involving invention, and we do not, therefore, desire to be limited to the particular arrangements illustrated in the drawings and described in the specification, but rather to the spirit and scope of our invention, as we have defined it in the appended claims.

What we seek to secure by United States Letters Patent is:—

1. In a train comprising a plurality of cars having doors and traps, means for operating each door, means connected to said means for operating each door and controlled by its trap for rendering each door suitable for operation for high level or low level platforms and common means for causing the high level doors to open, the traps for the high level doors being down.

2. In a train comprising a plurality of cars having doors and traps, means for operating each door, means connected to said means for operating each door and controlled by its trap for rendering each door suitable for operation for high level or low level platforms and common control means for causing the low level doors to open, the traps for the low level doors being up.

3. In a train comprising a plurality of cars having doors and traps, means for operating each door, means connected to said means for operating each door and controlled by its trap for rendering each door suitable for operation for high level or low level platforms and common means for causing either the doors arranged for high or low level operation to open, depending upon the position of the traps.

4. In a train comprising a plurality of cars, having doors and traps, means for operating each door, means connected to said means for operating each door and controlled by said traps for rendering each door suitable for operation for high level or low level platforms, a common control station, common means for causing the high level doors to open and separate opening and closing means for the door adjacent the common control station.

5. In a train comprising a plurality of cars having doors and traps, means for operating each door, means connected to said means for operating each door and controlled by said traps for rendering each door suitable for operation for high level or low level platforms, a common control station, common means for causing the low level doors to open and separate opening and closing means for the door adjacent the common control station.

6. In a train comprising a plurality of cars having doors and traps, means for operating each door, means connected to said means for operating each door and controlled by said traps for rendering each door suitable for operation for high level or low level platforms, a common control station, common means for causing either the doors arranged for high or low level operation to open as desired, and separate opening and closing means for the door adjacent the common control station.

7. In a train comprising a plurality of cars, having doors and traps, means for operating each door, means connected to said means for operating each door and controlled by said traps for rendering each door suitable for operation for high level or low level platforms, a common control station, common means for causing the high level doors to open, common means for closing all doors that are open and separate opening and closing means for the door adjacent the common control station.

8. In a train comprising a plurality of cars having doors and traps, means for operating each door, means connected to said means for operating each door and controlled by said traps for rendering each door suitable for operation for high level or low level platform, a common control station, common means for causing the low level doors to open, common means for closing all the doors that are open and separate opening and closing means for the door adjacent the common control station.

9. In a train comprising a plurality of cars, having doors and traps, means for operating each door, means connected to said means for operating each door and controlled by said traps for rendering each door suitable for operation for high level or low level platforms, a common control station, common means for causing either the doors arranged for high or low level operation to open as desired, common means for closing all doors that are open, and separate opening and closing means for the door adjacent the common control station.

10. In a multiple unit door control system for trains comprising a plurality of cars having doors and traps, the combination of means for opening the doors, a common control point, means for controlling the operation of the means for opening the doors, and means operated by the trap adjacent the control point for putting the door opening means under the influence of the controlling means.

11. In a multiple unit door control system for trains comprising a plurality of cars having doors and traps, means for opening and closing the doors, common means controlling said means, circuit connections between the said means and means in said circuit operated by the trap adjacent the control means for controlling the circuit whereby only doors whose traps are in the same position as said trap are opened.

12. In a multiple unit door control system for trains comprising a plurality of cars having doors and traps, means for opening and closing the doors, common means controlling said means, circuit connections between the said means, means in said circuit operated by the trap adjacent the control means for associating the circuits whereby only doors whose traps are in the same position as said trap is opened and common means for closing all open doors.

13. In a multiple unit door control system, for trains comprising a plurality of cars having doors and traps, motors for opening the doors controlled by magnets, means for energizing said magnets, circuit connections between said magnets and said energizing means, means in said circuit operated by the traps for closing said circuit to all doors with traps in the same position, and means for breaking the train circuits into a predetermined number of units.

14. In a multiple unit door control system for trains comprising a plurality of cars having doors and traps, the combination of pneumatic means for opening and closing the doors under the control of the traps having electrically operated valves, circuits including electrical valve operating means and means in said circuits at a control point for opening the door adjacent thereto regardless of the position of its trap.

15. In a multiple unit door control system, for trains, comprising a plurality of cars having doors and traps, the combination of pneumatic means for opening and closing the doors under the control of the traps having electrically operated valves, circuits including said electrical valve operating means, means in said circuits at a control point for opening the door adjacent the control point regardless of the position of the corresponding trap, and means for opening all the other doors in the unit whose traps are in the same position as the trap of the door at the control point.

16. In a multiple unit door control system for trains comprising a plurality of cars having doors and traps, the combination of pneumatic means for opening and closing the doors having electrically operated valves, circuits including said electrical valve operating means and under the control of said traps, means in said circuits at a control point for opening the door adjacent the control point regardless of the position of the corresponding trap, means for opening all the other doors in the unit whose traps are in the same position as the trap of the door at the control point, and means for sectionalizing the train circuits into any desired number of groups.

17. In a multiple unit door control system for trains comprising a plurality of cars having doors and traps the combination of pneumatic means for opening and closing the doors having electrically operated valves, circuits including said electrical valve operating means and under the control of said traps, means in said circuits at a control point for opening the door adjacent the control point regardless of the position of the corresponding trap, and means for closing all open doors.

18. In a multiple unit door control system, for trains comprising a plurality of cars having doors and traps, the combination of electrical circuits for each car controlled by said traps, and means for sectionalizing the circuits into groups comprising those of any desired number of cars.

19. In a multiple unit door control system for trains comprising a plurality of cars having doors and traps, the combination of electrical circuits for each car controlled by said traps, means for sectionalizing the circuits into groups comprising those of any desired number of cars, and common means in the circuits of each group for opening the doors of the groups whose traps are in the same position as that of the door at a control point.

20. In a multiple unit door control system for trains comprising a plurality of cars having doors, and traps, the combination of electrical circuits for each car controlled by said traps, means for sectionalizing the circuits into groups comprising those of any desired number of cars, common means in the circuits of each group for opening the doors of the groups whose traps are in the same position as that of the door at a control point, and means in the circuits of each group for closing all open doors of the group.

21. In a multiple unit door control system for a train comprising a plurality of cars having doors and traps the combination of means for opening the doors having magnet means controlling them, circuits for said magnet means, means in said circuits for operating said magnet means, means influenced by the traps to associate the circuits, so that only doors whose traps are in the same position as that of the door at a control point will be opened and means for opening the door at the point of control regardless of the position of its trap.

22. In a multiple unit door control system for a train comprising a plurality of cars having doors and traps, the combination of means for opening the doors having magnet means controlling them, circuits for said magnet means, means in said circuits for operating said magnet means, means influenced by the traps to associate the circuits so that only doors whose traps are in the same position as that of the door at a control point will be opened, means for opening the door at the point of control regardless of the position of its trap and means for closing all open doors.

23. The combination with one or more cars having a plurality of doorways, steps in said doorways, traps for said steps to render the doorways accessible for low level platforms when the traps are in one position, and for high level platforms when the traps are in closed position, a door for each doorway, means under the control of said traps for operating each door, a common means for controlling the operating means of all said doors, and means for rendering operative all of the door operating means when the traps are in closed position to render the doorways accessible for high level platforms.

24. The combination with one or more cars having a plurality of doorways, steps in said doorways, a trap for said steps to render each doorway accessible for low level platforms when the trap is in one position, and for high level platforms when the trap is in its closed position, a door for each doorway, means for operating said door, a common means for controlling the operating means of all said doors, means for rendering operative all of the door operating means and means for rendering the doors with the corresponding traps open inoperative.

25. The combination with one or more cars having a plurality of doorways, steps in said doorways, a trap for said steps to render each doorway accessible for low level platforms when the trap is in one position, and for high level platforms when the trap is in its closed position, a door for each doorway, means under the control of said traps for operating said door, a common means for controlling the operating means of all said doors, and means for rendering operative all of the door operating means for operating all of the doors, the position of the trap of which is the same as the trap of a master door on a car or train.

26. The combination with one or more cars having a plurality of doorways, steps in said doorways, a trap for said steps to render each doorway accessible for low level platforms when the trap is in one position, and for high level platforms when the trap is in its closed position, a door for each doorway, means under the control of said traps for operating said door, a common means for controlling the operating means of all of said doors, means for rendering operative all of the door operating means, and means for rendering inoperative all of the doors whose traps are not in the same position as the trap of a master door of the train or car.

In testimony whereof we have hereunto set our hands on this 26th day of February, A. D. 1926.

HAROLD ROWNTREE.
JOHN H. VANDER VEER.